Jan. 9, 1923.

F. C. BRANDENBURG.
CUTTER FOR EMERY WHEEL DRESSING TOOLS.
FILED APR. 10, 1919.

1,441,780.

Inventor:
F. C. Brandenburg
by Lacey & Lacey,
Attys.

Patented Jan. 9, 1923.

1,441,780

UNITED STATES PATENT OFFICE.

FRANCIS C. BRANDENBURG, OF PIQUA, OHIO.

CUTTER FOR EMERY-WHEEL DRESSING TOOLS.

Application filed April 10, 1919. Serial No. 288,936.

*To all whom it may concern:*

Be it known that I, FRANCIS C. BRANDENBURG, a citizen of the United States, residing at Piqua, in the county of Miami and State of Ohio, have invented certain new and useful Improvements in Cutters for Emery-Wheel Dressing Tools, of which the following is a specification.

This invention relates to cutters for emery wheel dressing tools and has as its object to provide an improved form of cutter designed for rough dressing such wheels, the cutter being especially designed for use in connection with the tool forming the subject matter of my Patent No. 1,042,761, issued October 29, 1912, and the improvement thereon shown in my copending application filed simultaneously herewith, Serial No. 288,934.

Another object of the invention is to provide a tool which will impart a spirally roughened face to the emery or other grinding wheel being rough dressed and which will evenly and yet rapidly act upon the face of the wheel to dress the same.

Another object of the invention is to provide a cutter the indivdual units of which may be pressed or stamped from sheet metal and thus manufactured at a low cost.

A further object of the invention is to provide a cutter the units of which will have such form that when a number of them are assembled they will be held against rotation past one another and yet may have limited turning movement to a desired extent and likewise a limited longitudinal movement.

Figure 1:
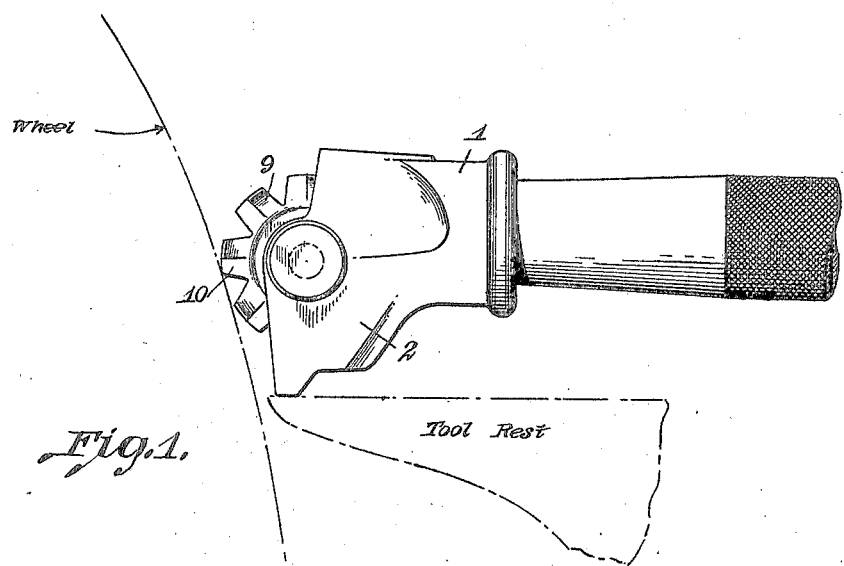
Figure 1 is a side elevation of the cutter embodying the present invention mounted in the head of the tool in connection with which it is to be employed and illustrating the manner of using the tool.

As the tool itself is described and claimed in my said patent and copending application, a specific description thereof is not here necessary, it being sufficient to state that the head of the tool, indicated in general by the numeral 1 in the drawings, is provided with spaced cheek pieces 2 between which the cutter is mounted and in which cheek pieces there is rotatably mounted a bearing spindle for the cutter indicated by the numeral 3. The cutter comprises an assemblage of units and as these units are of counterpart construction, a description of one will suffice for all. Each of these units, indicated in general by the numeral 4 is stamped or pressed from a circular sheet metal blank and in the stamping or pressing operation the blank is formed with a number of incisions 5 to define the teeth of the unit, said incisions extending radial to the axis of the unit. The unit is also stamped to form V-shaped notches 6 in its peripheral portion, the notches and incisions alternating as clearly shown in Fig. 3 of the drawings and the material between adjacent incisions and notches being acted upon to form the teeth. The unit is formed centrally with an opening 7 to receive the spindle 3 and each unit comprises a web portion 8 lying within the circle touched by the inner ends of all of the incisions and the notches, the incisions and notches being all substantially of the same length or depth. This web portion is flat upon both of its faces and, of course, when the unit is fitted upon its spindle occupies a plane at right angles to the axis of the spindle.

Figures 2, 3, 4:
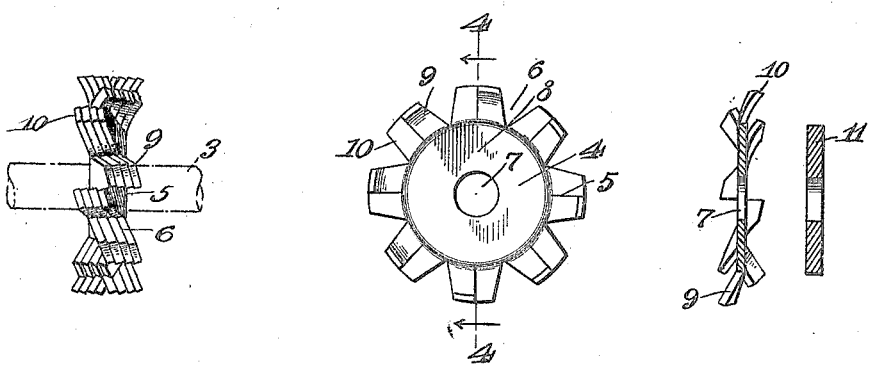
Fig. 2 is an edge view of the cutter comprising the assembled units.
Fig. 3 is a side elevation of one of the units.
Fig. 4 is a vertical sectional view on the line 4—4 of Fig. 3, the view also illustrating one of a pair of spacing or thrust washers employed in connection with the cutter.

Certain of the teeth of the unit are indicated by the numeral 9 and others by the numeral 10. Referring to Figs. 2 and 3 of the drawings, it will be observed that the teeth 9 and 10 lie or extend at opposite sides of the plane occupied by the web portion of the unit, the said teeth 9 and 10 being alternately arranged. By reference to Figs. 2 and 3 it will be observed that the teeth are arranged in a series of pairs or sets, each pair or set comprising one of the teeth 9 and one of the teeth 10 and each set being located between two of the incisions 5, the teeth 9 and 10 of each set being relatively separated by the respective notch 6. It will further be observed that while the teeth of each set are relatively separated by the respective notch and lie at opposite sides of the plane of the web portion of the unit, nevertheless the teeth of each set are correspondingly helically disposed with relation to the axis of the unit. In other words, the teeth of each set are distorted or twisted so that their common line of curvature is helical to the axis of the unit. Also it will be evident from the drawings that while the teeth 9 and 10 are located at opposite sides of the plane of the web of the unit, their outer edges are all inclined in the same direction and extend along lines spiral to the axis of the unit.

In building up the cutter, the desired number of units are assembled by disposal side by side upon the spindle 3 and when so disposed the side faces of the teeth of one unit will contact the side faces of the teeth of the next adjacent unit throughout the series. Also it is evident that when the units are properly assembled they will in a sense interlock so that relative rotation or turning of the teeth in one direction is positively prevented although there may be a slight relative movement of the teeth in the opposite direction of rotation which latter is desirable provided such movement or play is very limited. It will be understood, moreover, that the interlocking or interfitting of the units does not interfere with lateral displacement of the units with relation to one another, but this movement also is limited by the provision upon the spindles at the opposite ends of the assemblage of units, of washers 11 which contact the outer faces of the web portions 8 of the end units of the assemblage and also the inner or opposing faces of the cheek pieces 2 of the head of the tool 1 and which are of sufficient thickness to space the teeth from the said cheek pieces so that in the rotation of the cutter these teeth will not come into contact with the inner faces of the said cheek pieces to interfere with the rotation of the cutter upon its spindle.

It will be evident from the foregoing and from inspection of the drawing and particularly Fig. 2 that in the rotation of the cutter the face of the emery or other grinding wheel being dressed will have substantially spirally extending striations cut therein due to the fact that the outer edges of all of the teeth of the units are inclined in the same direction, but due to the displacement of the teeth of each set at opposite sides of the plane of the web of the unit and the formation of the notches 6 between the teeth of each set, the outer ends of the teeth will be so relatively spaced throughout the entire series that the face of the grinding wheel will be rough cut.

Having thus described the invention, what is claimed as new is:

1. A cutter unit for a dressing tool comprising a disk having a peripheral series of integral teeth arranged alternately at opposite sides of the plane of the disk, the cutting edges of all the teeth extending diagonally of the plane of the disk in the same helical direction.

2. A cutter unit for a dressing tool comprising a circular sheet metal disk provided axially with a spindle receiving opening and having its peripheral portion formed with radial incisions, the material between the incisions being distorted to provide a peripheral series of staggered teeth having their cutting ends extending diagonally of the plane of the disk.

3. A cutter for a dressing tool comprising an assemblage of cutter units each having a peripheral series of staggered teeth having their cutting ends extending diagonally of the plane of the unit, corresponding teeth of the units lying side by side throughout the series.

4. A cutter for a dressing tool comprising an assemblage of cutter units disposed with their side faces in mutual contact throughout the series, the said units being provided with registering incisions and the material between the incisions in each unit being distorted to provide staggered teeth, corresponding teeth of the units lying side by side throughout the series.

5. A cutter for a dressing tool comprising an assemblage of cutter units, each having a peripheral series of staggered teeth having their cutting edges extending diagonally of the plane of the unit, corresponding teeth of the units being arranged in alignment through the series of units.

6. A cutter for a dressing tool comprising an assemblage of cutter units each having a peripheral series of staggered teeth, the units being arranged side by side and the teeth of adjacent units being helically disposed and interlocking in a manner to permit relative rotative displacement of the teeth in one direction and prevent rotation of the teeth in the other direction except to resume the normal relation.

7. A cutter for a dressing tool comprising an assemblage of cutter units each having a peripheral series of helically disposed staggered teeth, a spindle upon which the units are rotatably mounted side by side, the teeth of adjacent units interlocking, and means upon the spindle to limit relative lateral separation of the units.

8. A cutter unit for a dressing tool comprising a disk having peripheral teeth extending alternately at opposite sides of the plane of the disk with the cutting edges of all the teeth extending in the same helical direction and diagonally of the said plane.

9. A cutter unit for a dressing tool comprising a disk having teeth extending from its periphery and helically disposed with relation to the axis of the disk and located alternately at opposite sides of the plane of the disk, the cutting edges of all of the teeth being correspondingly inclined with relation to the axis and the bases of all the teeth being in the same plane.

10. A cutter unit for a dressing tool comprising a body having a peripheral series of sets of staggered teeth, the teeth of each set being divided by an intervening notch, and the said teeth of each set extending in the same helical direction and being helically disposed with relation to the axis of the body.

11. A cutter unit for a dressing tool comprising a body having a peripheral series of sets of staggered teeth, adjacent teeth of adjacent sets being divided by intervening incisions and the teeth of each set being divided by an intervening notch.

12. A cutter unit for a dressing tool comprising a body having a peripheral series of sets of staggered teeth, adjacent teeth of adjacent sets being divided by intervening incisions and the teeth of each set being divided by an intervening notch, the said teeth of each set being helically disposed with relation to the axis of the body.

13. A cutter unit for a dressing tool comprising a body having a peripheral series of sets of teeth, adjacent teeth of adjacent sets being divided by intervening incisions and the teeth of each set being divided by an intervening notch, the teeth of each set being disposed at opposite sides of the plane of the body.

14. A cutter unit for a dressing tool comprising a disk having a peripheral series of sets of staggered teeth, adjacent teeth of adjacent sets being divided by intervening incisions and the teeth of each set being divided by an intervening notch, the cutting edges of the teeth of any set touching a common line spiral to the axis of the disk.

15. A cutter unit for a dressing tool comprising a circular sheet metal body formed in its peripheral portion with alternating radial incisions and notches, the material at the opposite sides of each notch being distorted in opposite directions to provide teeth lying at opposite sides of the plane of the body.

In testimony whereof I affix my signature.

FRANCIS C. BRANDENBURG.